United States Patent
Kalm et al.

(10) Patent No.: US 11,939,156 B1
(45) Date of Patent: Mar. 26, 2024

(54) FLEXIBLE CONTAINER PODS FOR USE WITH ROBOTIC SYSTEMS

(71) Applicant: Amazon Technologies, Inc., Seattle, WA (US)

(72) Inventors: William Scott Kalm, Seattle, WA (US); Kevin Senh Ly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 516 days.

(21) Appl. No.: 16/984,754

(22) Filed: Aug. 4, 2020

(51) Int. Cl.
| | |
|---|---|
| *B65G 1/02* | (2006.01) |
| *B25J 9/16* | (2006.01) |
| *B25J 15/00* | (2006.01) |
| *B65D 90/00* | (2006.01) |
| *B65G 1/04* | (2006.01) |
| *B65G 1/06* | (2006.01) |
| *B65G 1/137* | (2006.01) |
| *B66F 9/06* | (2006.01) |
| *G05B 19/418* | (2006.01) |

(52) U.S. Cl.
CPC .............. *B65G 1/02* (2013.01); *B25J 9/1679* (2013.01); *B25J 15/0019* (2013.01); *B65D 90/0073* (2013.01); *B65G 1/0492* (2013.01); *B65G 1/065* (2013.01); *B65G 1/137* (2013.01); *B66F 9/063* (2013.01); *G05B 19/41895* (2013.01)

(58) Field of Classification Search
CPC ....... B25J 9/1679; B25J 15/0019; B65G 1/02; B65G 1/137; B65G 1/0492; B65G 1/065; B65D 90/0073; B66F 9/063; G05B 19/41895
See application file for complete search history.

(56) References Cited

U.S. PATENT DOCUMENTS

| | | | | |
|---|---|---|---|---|
| 2,638,399 | A * | 5/1953 | Seymour ............... | D06F 95/004 220/9.3 |
| 3,601,462 | A * | 8/1971 | Fenwick ................. | A47F 3/005 312/139.2 |
| 5,351,842 | A * | 10/1994 | Remmers ................... | A47F 5/08 108/29 |

(Continued)

OTHER PUBLICATIONS https://www.amazon.com/Marble-Field-Aluminum-Foldable-Waterproof/dp/B07JCNW7B3 (Year: 2019).*

(Continued)

*Primary Examiner* — Thomas Randazzo
(74) *Attorney, Agent, or Firm* — Eversheds Sutherland (US) LLP

(57) ABSTRACT

Systems and methods are disclosed for flexible container pods for use with robotic systems. In one embodiment, an example flexible container pod may include a center plate having a plurality of apertures, a first member coupled to an upper end of the center plate, a second member coupled to the upper end of the center plate, and a base coupled to the center plate. The flexible container pod may include a first net extending from the first member to the base, a second net extending from the second member to the base, a first shelf member coupled to the first net, and a second shelf member coupled to the second net. A container can be removably positioned on the first shelf member and the second shelf member.

20 Claims, 12 Drawing Sheets

(56) References Cited

U.S. PATENT DOCUMENTS

| | | | | |
|---|---|---|---|---|
| 5,720,230 | A * | 2/1998 | Mansfield | A47F 5/0043 211/DIG. 1 |
| 5,752,439 | A * | 5/1998 | LaMora, Jr. | B30B 9/3042 100/229 A |
| 6,691,879 | B1 * | 2/2004 | Alvarez | B62B 3/02 211/85.24 |
| 8,983,647 | B1 * | 3/2015 | Dwarakanath | G05D 1/0217 700/216 |
| 9,008,827 | B1 * | 4/2015 | Dwarakanath | F25B 27/00 700/214 |
| 9,290,288 | B1 * | 3/2016 | Ikeno | A47B 55/06 |
| 9,558,472 | B1 * | 1/2017 | Tubilla Kuri | B25J 9/0093 |
| 9,572,426 | B1 * | 2/2017 | Nauseda | A47B 57/00 |
| 11,297,967 | B2 * | 4/2022 | Guyette | B65G 1/026 |
| 2005/0225108 | A1 * | 10/2005 | Panasewicz | B60R 11/00 296/24.44 |
| 2006/0048459 | A1 * | 3/2006 | Moore | E04B 1/34321 52/79.1 |
| 2006/0157358 | A1 * | 7/2006 | Heidel | D06F 95/002 206/278 |
| 2007/0200471 | A1 * | 8/2007 | Boone | D06F 95/002 312/211 |
| 2007/0278169 | A1 * | 12/2007 | Grainger | B65D 90/0073 211/186 |
| 2011/0232216 | A1 * | 9/2011 | Schroeder | E04C 5/12 52/223.8 |
| 2017/0020286 | A1 * | 1/2017 | Pierson | A47B 96/021 |
| 2017/0238700 | A1 * | 8/2017 | Davis | A47B 43/04 |
| 2018/0004195 | A1 * | 1/2018 | Finke | G06Q 10/08 |
| 2018/0168346 | A1 * | 6/2018 | King | F16B 1/00 |
| 2018/0305085 | A1 * | 10/2018 | Tubilla Kuri | B25J 9/1679 |

OTHER PUBLICATIONS

Marble Field Laundry Hampers X-Frame Double Laundry Basket 3 Section Oxford Dirty Laundry Hamper Sorter Aluminum Frame Foldable Waterproof Bags with Handles Light Grey Figure 5 of 7 https://www.amazon.com/Marble-Field-Aluminum-Foldable-Waterproof/dp/B07JCNW7B3 (Year: 2019).*

* cited by examiner

FLEXIBLE CONTAINER PODS FOR USE WITH ROBOTIC SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
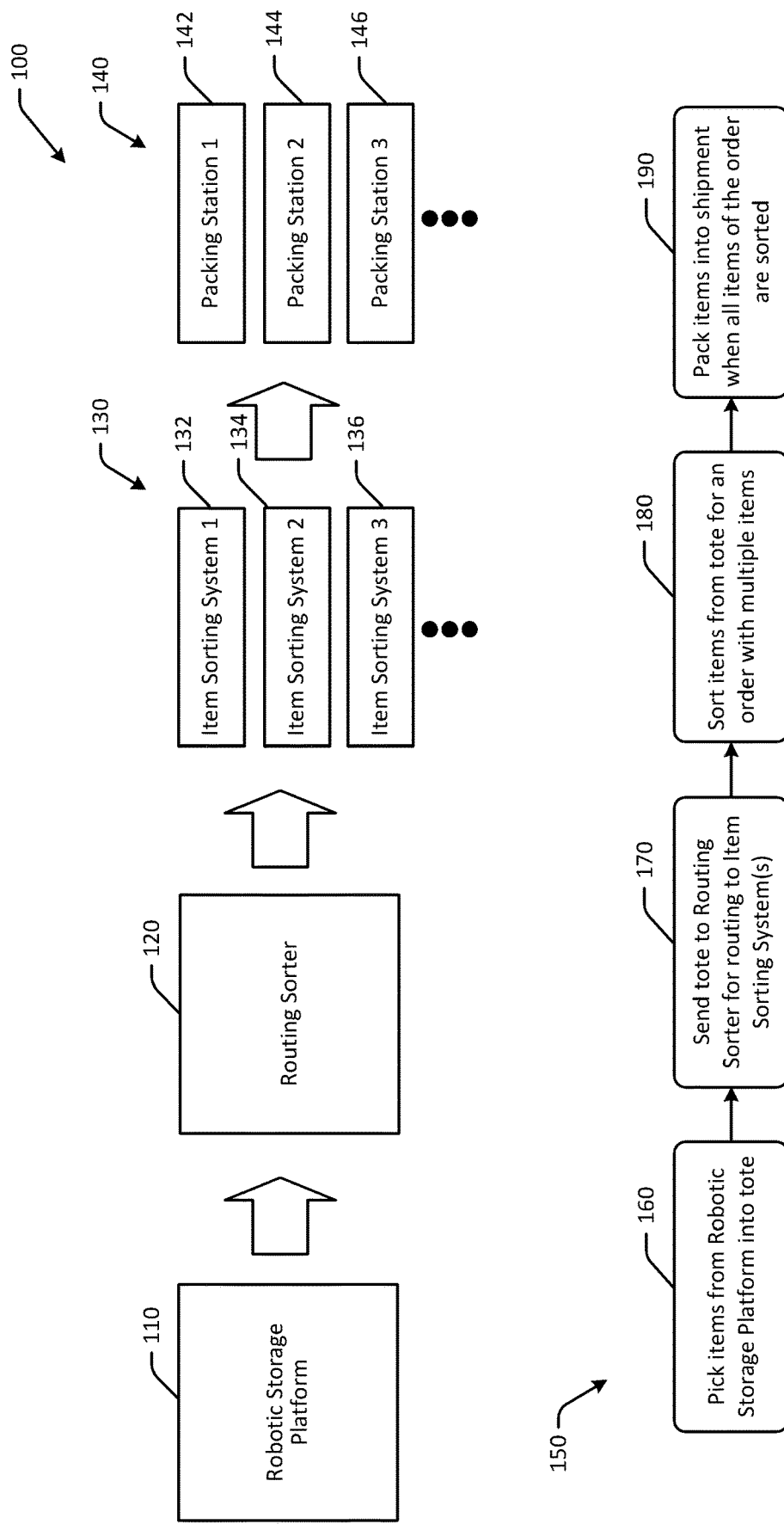
FIG. 1 is a hybrid schematic illustration of an example use case for flexible container pods for use with robotic systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers for storage (e.g., inventory hold, etc.), transport, sortation, etc., the containers may be placed in pods or other structures configured to hold a plurality of containers. For example, a container pod may be configured to store one or more containers, such as totes, bags, and other containers, in one or more columns and/or rows. Container pods may be flexible in that vertical walls of the container pods may be flexible, such as flexible walls formed using netting, thereby increasing horizontal tolerances to assist with container placement. In addition, some or all of the container slots in a container pod may be filled or unfilled. Container pods may serve as temporary storage location for containers. Containers may be filled or unfilled, such as filled with items in inventory. Container pods may also be flexible in that the container pods may be transported to or from various locations in a fulfillment center. Accordingly, the container pod location may be flexible. Container pods may be transported by lifting the container pod off the ground and transporting the container pod. In some instances, autonomous robots may lift the container pod and transport the container pod, including the containers stored at the container pod, from a first location to a second location.

Embodiments of the disclosure include flexible container pods for use with robotic systems. For example, robotic systems may include autonomous robots that transport the flexible container pods, autonomous robotic arms that load and/or unload containers from the flexible container pods, and other robotic systems. Flexible container pods described herein may have a reduced weight relative to other storage structures, which may increase a battery life (or decrease battery usage) of autonomous robots that move the flexible container pods due to the reduced weight. As a result, autonomous robots may travel further or need to be recharged at a reduced frequency. Flexible container pods described herein may include increased tolerances for loading and unloading of containers as a result of improved shelf member design and flexible sidewalls, which may reduce a level of accuracy needed by robotic manipulators to load and unload containers. For example, tolerances may be increased by about 50%, which may indicate that the robotic manipulator no longer has to be as accurate when placing a container into, or removing a container from, the flexible tote pod. As a result, certain components, such as camera systems, may no longer need to be deployed at robotic manipulators, resulting in cost savings. Cameras may no longer be needed due to the increased tolerances of positioning the containers. Loading and unloading time may also be decreased, resulting in increased throughput of containers and items. Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for flexible container pods for use with robotic systems and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in flexible container pods in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
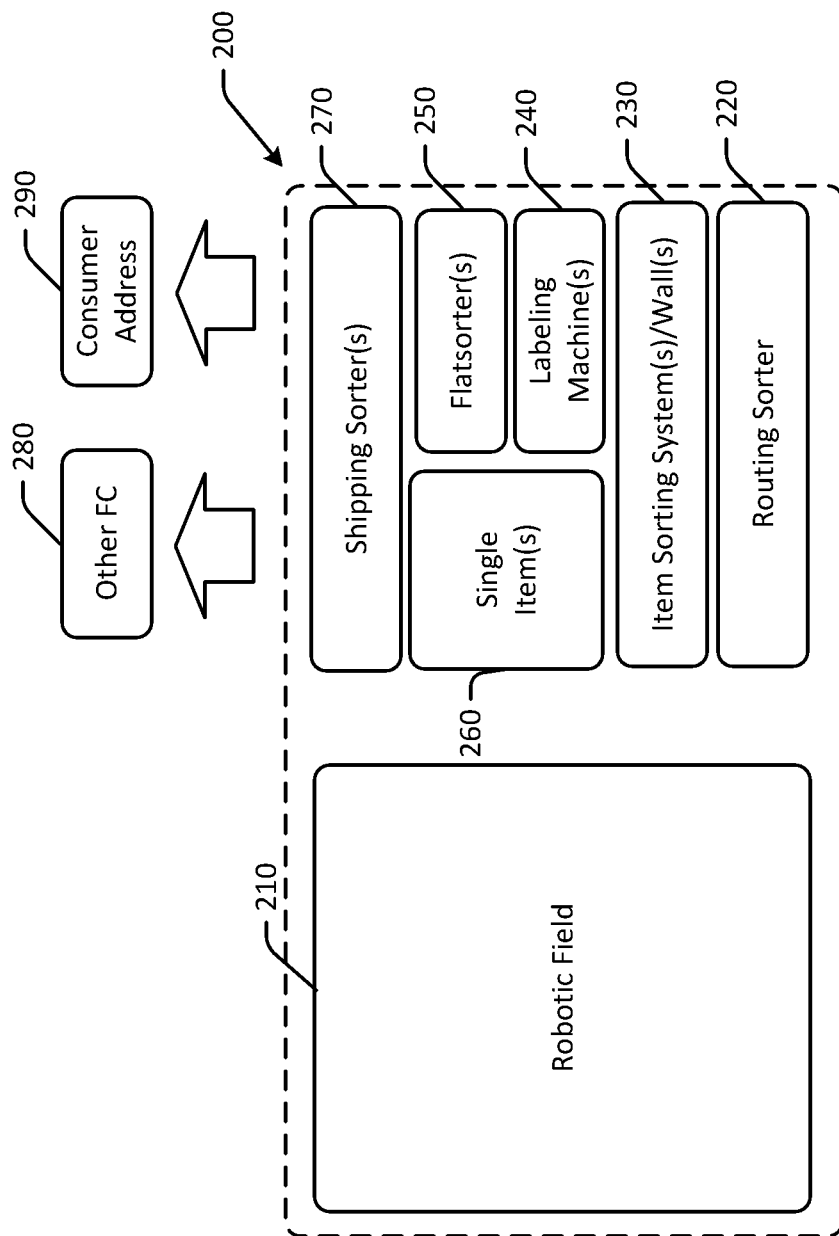
FIG. 2 is a hybrid schematic illustration of an example use case for flexible container pods for use with robotic systems in accordance with one or more embodiments of the disclosure.

FIG. 2 is a hybrid schematic illustration of an example use case for flexible container pods for use with robotic systems in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include flexible container pods for use with robotic systems. The flexible container pods may be used to store, at least temporarily, containers that may have products or items inside. Certain embodiments may improve processing speed and/or throughput of fulfillment centers. Certain embodiments may improve performance of mechanical equipment for sortation and/or consolidation of items for multi-item orders via increased tolerances. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
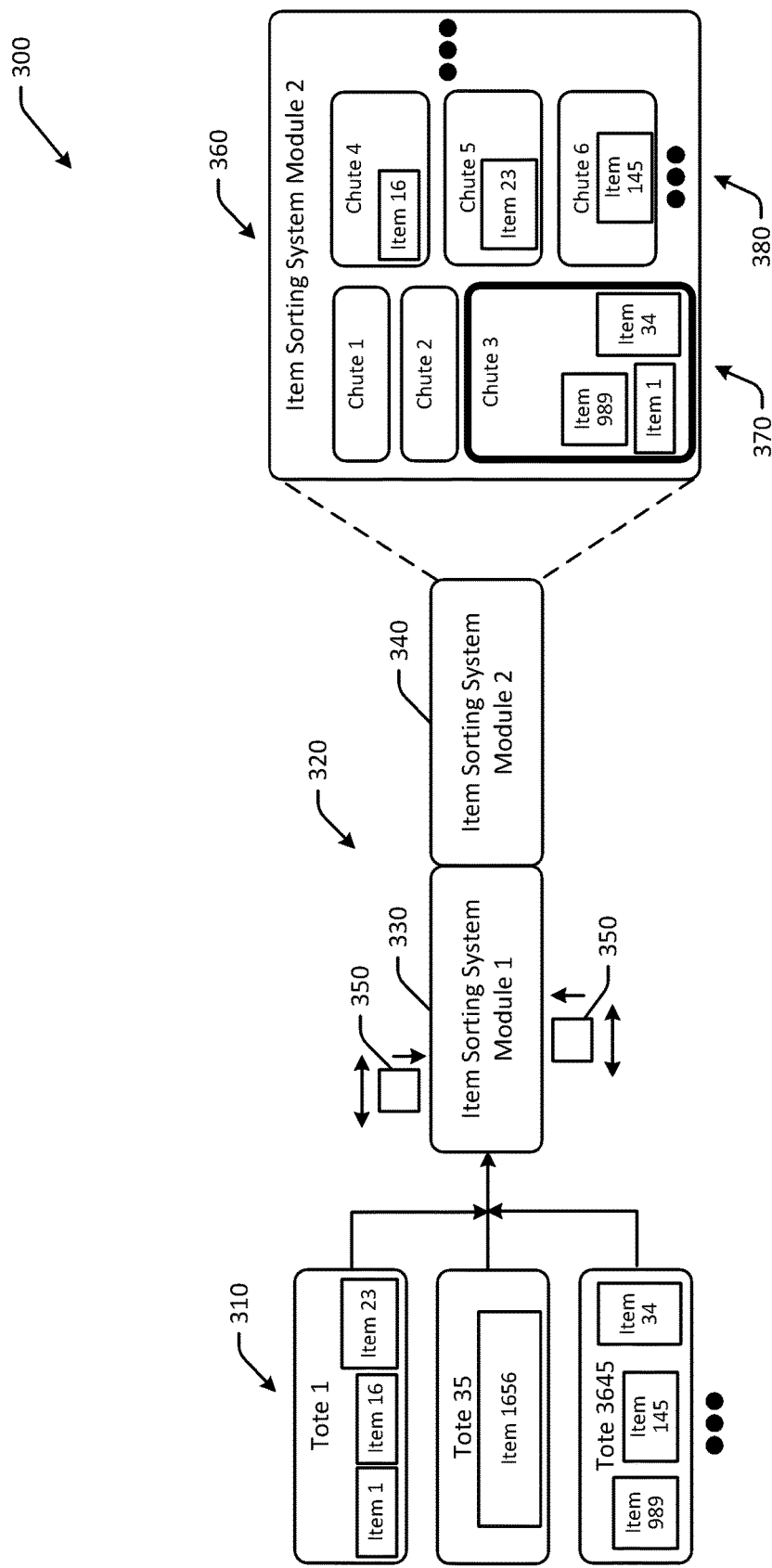
FIG. 3 is a schematic illustration of an item sorting system and additional components in accordance with one or more embodiments of the disclosure.

FIG. 3 is a schematic illustration of an item sorting system and additional components in accordance with one or more embodiments of the disclosure. Other embodiments may include additional or fewer components. The illustration of FIG. 3 is not to scale, and may not be illustrated to scale with respect to other figures. The item sorting system illustrated in FIG. 3 may be the same item sorting system discussed with respect to FIGS. 1-2.

In FIG. 3, an example use case 300 including a set of totes 310 and an item sorting system, or a multi-module item sorting machine 320, is depicted. The set of totes 310 may have been retrieved from, or may be destined for, a flexible container pod. The set of totes 310 may include one or more totes that may optionally be assigned to, or otherwise routed to, the item sorting system 320. For example, Tote 1, Tote 35, Tote 3645, and so forth may be routed to the item sorting system 320. The totes may have identifiers, such as alphanumeric or other identifiers. The totes may be used to place items that have been picked into the totes. The items that are placed in the totes may be associated with orders that are to be consolidated by the item sorting system 320, or may be items that are to be transferred to a different fulfillment center. For example, Tote 1 may include item 1, item 16, and item 23, Tote 35 may include item 1656, Tote 3645 may include item 989, item 145, and item 34, and so forth. The item sorting system, or the item sorting machines 320, may be configured to receive items from a tote that includes one or more, such as multiple items, and the tote may be assigned to, or otherwise routed to, the item sorting system or the item sorting machine 320.

The totes 310 may be directed to the item sorting system 320 for sorting and consolidation. For example, items in the totes 310 may be inducted into the item sorting system 320 via a conveyor belt. The item sorting system machine 320 may include one or more modules, and may be adjusted in size by adding or removing modules as needed. For example, the item sorting system 320 may include a first modular item sorting machine 330 and a second modular item sorting machine 340. The second modular item sorting machine 340 may be coupled to the first modular item sorting machine 330.

The first modular item sorting machine 330 may include a first support disposed on a first side of the first modular item sorting machine 330, and a second support disposed on the first side of the first modular item sorting machine 330. One or more chutes may be coupled to one or more sides of the first modular item sorting machine 330 and/or the second modular item sorting machine 340. The first modular item sorting machine 330 may include a first chute positioned at a first location, and a second chute positioned at a second location. The first chute and the second chute may have the same dimensions or different dimensions. In some embodiments, containers or chutes may be disposed about more than one side of the first modular item sorting machine 330.

The second modular item sorting machine 340 may include a third support disposed on the first side of the second modular item sorting machine 340, and a fourth support disposed on the first side of the second modular item sorting machine 340. One or more chutes may be coupled to one or more sides of the second modular item sorting machine 340. The second modular item sorting machine 340 may include a third chute positioned at a first location, and a fourth chute positioned at a second location. The third chute and the fourth chute may have the same dimensions or different dimensions, and may have different dimensions than the first chute and/or the second chute. The first chute, the second chute, the third chute, and/or the fourth chute can be rearranged in different vertical or horizontal locations and/or coupled to different containers, and may be configured to receive packages, items of orders comprising multiple items, or other items. In some embodiments, containers and corresponding chutes may be disposed about more than one side of the second modular item sorting machine 340.

The respective modules of the item sorting system machine 320 may include one or more chutes that hold multiple items. For example, as illustrated in side view 360, the second modular item sorting machine 340 may include a first set of chutes 370, and a second set of chutes 380. The item sorting system machine 320 may include a plurality of chutes disposed in an array or other arrangement along one or more sides of the first modular item sorting machine 330 and the second modular item sorting machine 340. In FIG. 3, Chute 1 and Chute 2 may have the same dimensions, while Chute 3 in the same column may have a different dimension. Any suitable number of chute may be included.

Items or packages inducted (e.g., from the totes 310, from a conveyor belt, etc.) may be sorted and directed to a chute associated with the item or package. The items may be transported by one or more shuttles 350, which may move in one or more directions within the item sorting system machine 320. In some embodiments, the shuttles 350 may be positioned outside of the item sorting system machine 320.

For example, Item 1 may be inducted from Tote 1 and placed in Chute 3, along with Item 989 and Item 34 from Tote 3645. Chute 3 may be associated with an order that included those three items, and may therefore be ready for packing. Similarly, Item 16 may be routed to Chute 4, Item 23 may be routed to Chute 5, Item 145 may be routed to Chute 6, and so forth. Any number of chutes, containers, totes, and/or modules may be included.

Figure 4:
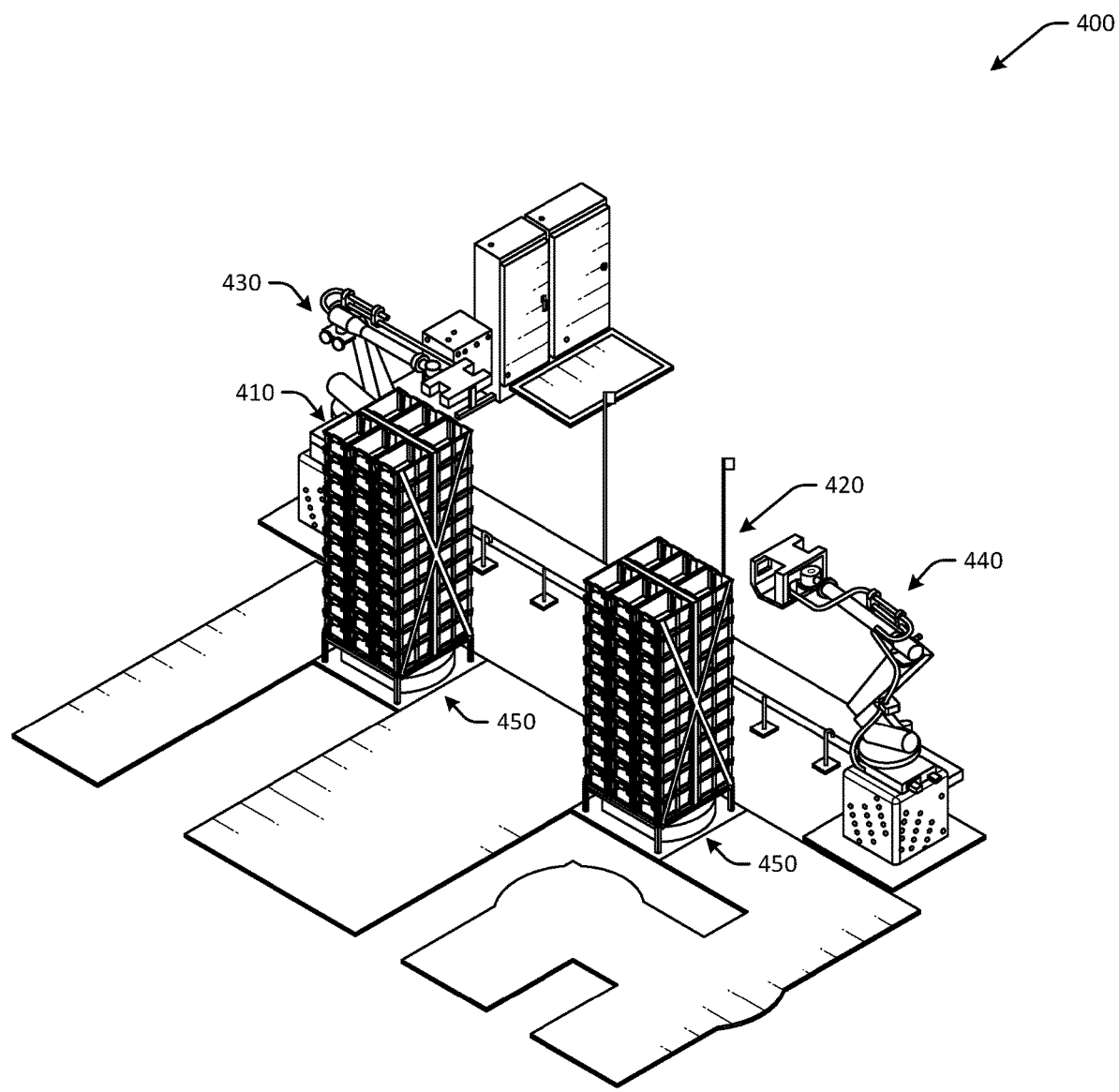
FIG. 4 is a schematic illustration of an example system with flexible container pods and robotic systems in accordance with one or more embodiments of the disclosure.

FIG. 4 is a schematic illustration of an example system 400 with flexible container pods and robotic systems in accordance with one or more embodiments of the disclosure. Other embodiments may include additional or fewer components. The illustration of FIG. 4 may not be to scale, and may not be illustrated to scale with respect to other figures. The system illustrated in FIG. 4 may be the same system discussed with respect to FIGS. 1-3.

In FIG. 4, the system 400 may be a system to store and/or transport containers. For example, the system 400 may include a first flexible container pod 410 and a second flexible container pod 420. Both the first flexible container pod 410 and the second flexible container pod 420 may be configured to store one or more containers, such as totes. The containers may be at least partially full of items, or may be empty. The containers may be open top or closed top containers. The first flexible container pod 410 and the second flexible container pod 420 may have any suitable number of container slots in which to receive containers. For example, both the first flexible container pod 410 and the second flexible container pod 420 may each have ten rows and three columns of container slots, such that each side of the respective container pod can store thirty containers (with a total of sixty container slots for embodiments with container slots on a front side and a back side of the flexible container pod, such as those illustrated in FIG. 4). Any number of container slots may be included. Some container slots may have different dimensions to accommodate containers of different sizes, whereas in other embodiments, each container slot may have the same dimensions.

Containers may be loaded into and removed from the flexible container pods using one or more robotic manipulators, such as a first robotic arm 430 and a second robotic arm 440. The respective robotic arms (or other robotic manipulators) may be configured to grasp containers and move the containers into and out of container slots on the flexible container pods.

The flexible container pods may be transported with or without containers, and with some or all of the container slots filled, using one or more autonomous robots 450. For example, as illustrated in FIG. 4, the autonomous robots 450 may be configured to lift the flexible container pods from underneath (e.g., via contact with a base of the respective flexible container pod, etc.), and may transport the flexible container pod from a first location to a second location, such as from an inbound dock to an inventory holding field. The flexible container pods may be rigid and avoid collapse during lifting, transport, and/or other manipulation by the autonomous robots 450.

In one example embodiment, the system 400 may be a container transportation system that includes a container carrying assembly, such as the first flexible container pod 410 and the second flexible container pod 420, a robotic manipulator (such as the first robotic manipulator 430 and the second robotic manipulator 440) configured to insert and remove a container from the container carrying assembly, and an autonomous robot (such as autonomous robot 450) configured to transport the container carrying assembly from a first location to a second location.

Figure 5A:
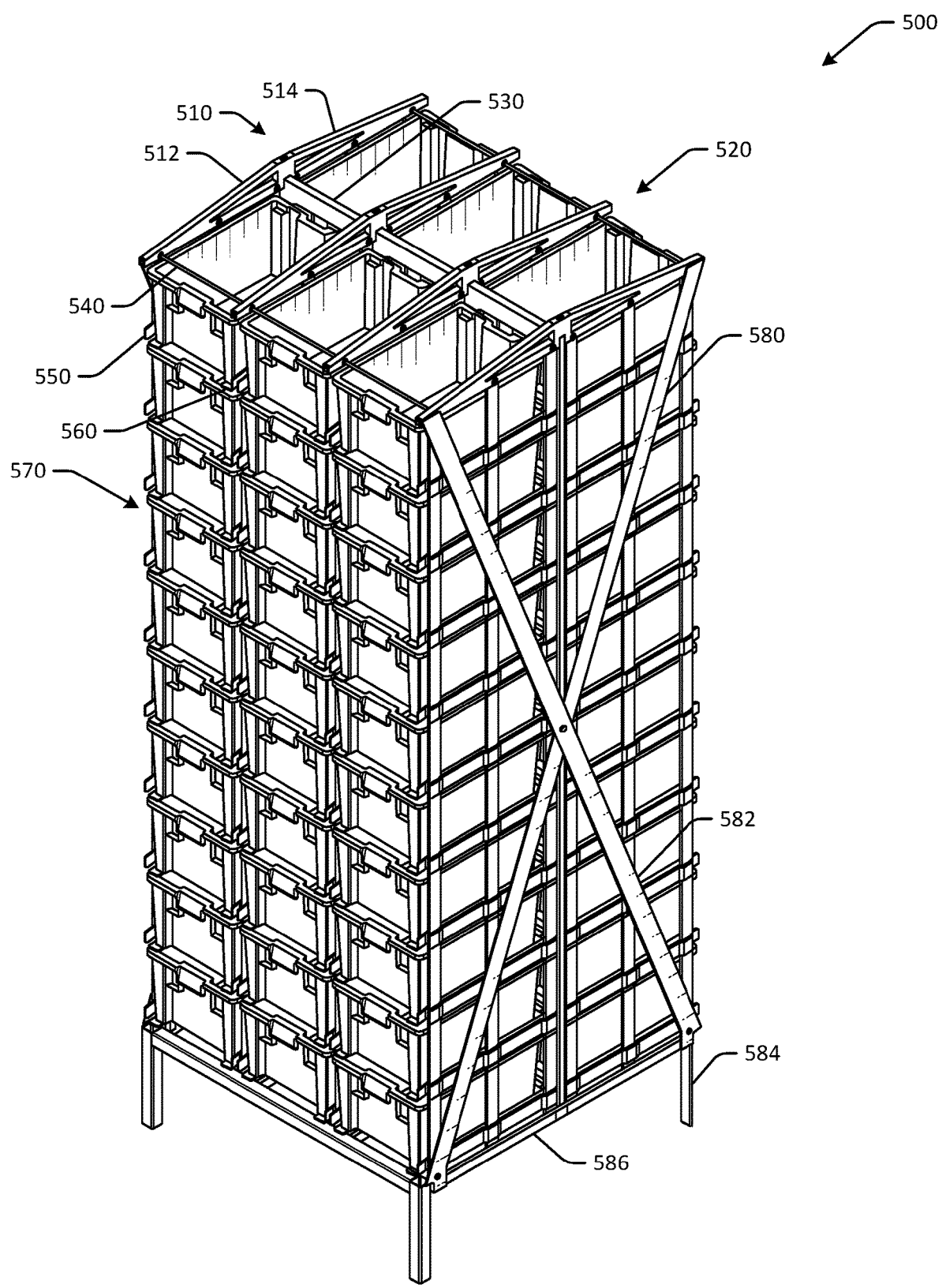
FIG. 5A is a schematic illustration of a perspective view of a flexible container pod in accordance with one or more embodiments of the disclosure.

FIG. 5A is a schematic illustration of a perspective view of a flexible container pod 500 in accordance with one or more embodiments of the disclosure. Other embodiments may include additional or fewer components. The illustration of FIG. 5A may not be to scale, and may not be illustrated to scale with respect to other figures. The flexible container pod illustrated in FIG. 5A may be the same flexible container pod discussed with respect to FIGS. 1-4.

The flexible container pod 500 may be a container carrying assembly for use with a robotic system, such as an autonomous transport robot, a robotic arm, or another type of robotic manipulator. As illustrated in FIG. 5A, the flexible container pod 500 may include a number of containers 520 stored in container slots. The container slots may be separated by vertical sidewalls that may be formed of nets, slats, or other material, as described in detail with respect to FIG. 7A. One or more slots may be formed in the vertical sidewalls. The slots may be configured to receive brackets that can slide into and out of the slots. The brackets may be coupled to shelf members configured to support lower portions of the container in a particular slot.

The flexible container pod 500 may include a number of outriggers or overhead members 510 that provide support for the load of the flexible container pod 500. The overhead members 510 may include a flat side and an angled side. The flat side may be a lower surface of the overhead member 510, and the angled side may be an upper surface of the overhead member 510 (lower, upper, bottom, top, and the like are used to describe relative positioning, and not absolute positioning, herein). For example, the overhead member 510 may be a first member and may include a first taper 512 between a center of the first member and a first end of the first member, and a second taper 514 between the center of the first member and a second end of the first member. The tapered design may improve the stress distribution and load support provided by the overhead member 510. In some embodiments, the overhead member 510 may include one or more apertures extending through a body of the overhead member 510. For example, in the illustrated embodiment, two triangular apertures are formed in the body of the overhead member 510. The apertures may reduce a weight of the overhead member 510 while avoiding negative impact to the strength of the overhead member 510. Any number of outriggers or overhead members may be included. For example, an outrigger or overhead member may be disposed at either side of the flexible container pod 500, along with at least one outrigger between each column of containers. The outriggers or overhead members may provide support for containers on either side of the flexible container pod 500. The outriggers or overhead members may be formed of plastic, aluminum (or another metal), a composite material, or a different type of material. One or more cross rods 540 may be disposed through apertures in the overhead members 510 to provide additional support and rigidity. For example, the cross rods 540 may be disposed at or near ends of the overhead members 510. The cross rods 540 may be coupled to some or all of the members 510.

The flexible container pod 500 may include a center plate 530. The center plate 530 may be formed of aluminum, plastic, a composite, or a different type of material. The center plate 530 may improve the structural rigidity of the flexible container pod 500 and may provide a backstop against which the containers may be placed. The center plate 530 may include one or more apertures, such as a plurality of apertures, to reduce a weight of the center plate 530. In some embodiments, the center plate 530 may include an array of apertures, as depicted in FIG. 5C. The outriggers or members 510 may be coupled to an upper end of the center plate 530. A lower end of the center plate 530 may be coupled to a base 586 of the flexible container pod 500.

The flexible container pod 500 may include one or more nets 570. The nets 570 may form sidewalls of the flexible container pod 500. The nets 570 may be formed of, for example, a fabric material (e.g., a polyester material, a cloth material, a knit material, etc.), KEVLAR®, an aluminum material, a synthetic material, or a different type of material. The nets 570 may be more flexible than a rigid sidewall, such as a metal sidewall, thereby providing increased lateral tolerance for placement of containers between the nets 570. The nets 570 may extending from the overhead member 510 to the base 586 of the flexible container pod 500. For example, the net 570 may be coupled to the member 510 and to the base 586 and may be tensioned. In the illustrated embodiment, a total of eight discrete nets 570 may be used, with four on either side of the flexible container pod 500. The nets 570 may include slots in which brackets may be slid to allow for one or more shelf members to be removably coupled to the nets 570. For example, a first shelf member 550 may be coupled to a first net, and a second shelf member 560 may be coupled to a second net. The respective first shelf member 550 and the second shelf member 560 may be configured to support a container disposed between the first shelf member 550 and the second shelf member 560. The first shelf member 550 and the second shelf member 560 may include flared surfaces or flared ends at a distal end (e.g., outward facing end, etc.) to guide containers into the container slot formed by the first shelf member 550 and the second shelf member 560. Proximal ends of the first shelf member 550 and the second shelf member 560 may be an unflared end (e.g., right angled or otherwise default, etc.). A container 520 can be removably positioned on the first shelf member 550 and the second shelf member 560. The shelf members may be formed of a synthetic material, a composite material, a plastic material, a metallic material, or another type of material, and may be a consumable component in some instances.

The flexible container pod 500 may include one or more cross braces. For example, a first cross brace member 580, which may be formed of aluminum, may be coupled to a first member 510 and the base 586, and a second cross brace member 582 may be coupled to the first member 510 and the base 586. The second cross brace member 582 may be disposed transverse to the first cross brace member 580. The cross braces may be coupled to a first tubular member of the base 586. The cross braces may support the center plate 530 and the members 510.

The base 586 may include a number of tubular members that form a rectangular geometry, as well as one or more cross members that can be used to lift and support the flexible container pod 500 during transport. The base 586 may include one or more legs 584, such as tubular legs, that provide clearance under the flexible container pod 500 for an autonomous robot (or portion thereof) to slide underneath.

The flexible container pod 500 may therefore be a container carrying assembly that is configured to receive totes or other containers from a robotic manipulator, and may be configured to be transported by an autonomous robot. The flexible container pod 500 may have a weight that is approximately 30% less than other container carriers.

Figure 5B:
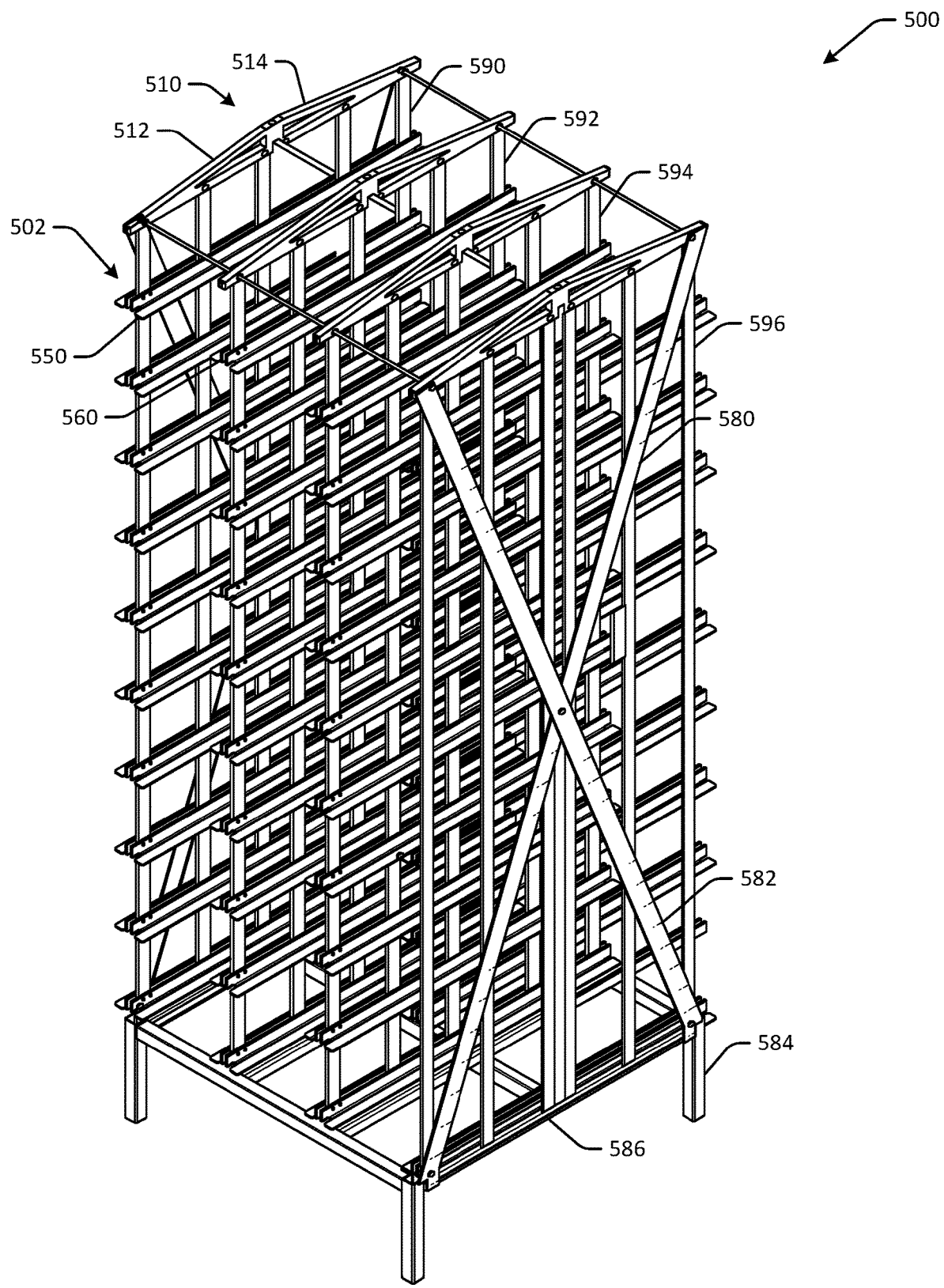
FIG. 5B is a schematic illustration of a perspective view of a frame of the flexible container pod of FIG. 5A in accordance with one or more embodiments of the disclosure.
Figure 5C:
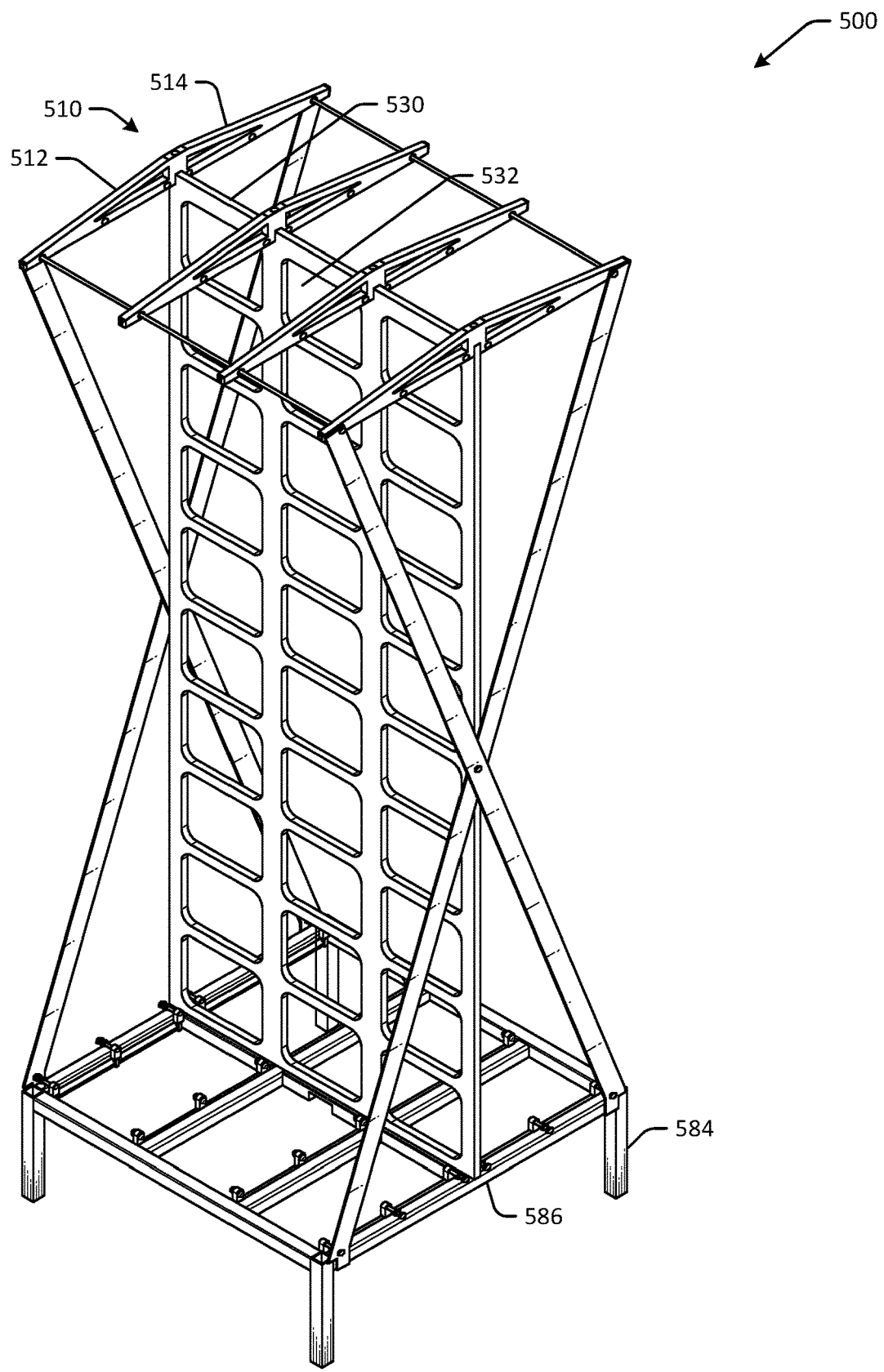
FIG. 5C is a schematic illustration of a perspective view of the flexible container pod of FIG. 5A without containers in accordance with one or more embodiments of the disclosure.

FIG. 5B is a schematic illustration of a perspective view of a frame of the flexible container pod 500 of FIG. 5A in accordance with one or more embodiments of the disclosure. Other embodiments may include additional or fewer components. The illustration of FIG. 5B may not be to scale, and may not be illustrated to scale with respect to other figures.

In FIG. 5B, the flexible container pod 500 is depicted without containers in the container slots 502. Individual nets or slats that form sidewalls or vertical supports of the flexible container pod 500 are visible in the illustrated embodiment. For example, a first net 590 may be disposed at a first side of the flexible container pod 500, a second net 592 may be disposed adjacent to the first net 590, a third net 594 may be disposed adjacent to the second net 592, a fourth net 596 may be disposed adjacent to the third net 594 and may be disposed at a second side of the flexible container pod 500. A first column may be formed between the first net 590 and the second net 592, a second column may be formed between the second net 592 and the third net 594, a third column may be formed between the third net 594 and the fourth net 596, and so forth. Any number of columns may be included. The individual nets may be tensioned, but may provide an amount of lateral flexibility that provides increased tolerance in a lateral direction when loading containers into a container slot of the flexible container pod 500.

The respective nets may include one or more slots into which brackets may be placed to support the shelf members. For example, the first net 590 may include a first slot and a second slot, and the flexible container pod 500 may include a first bracket inserted in the first slot, and a second bracket inserted in the second slot. The first shelf member may be coupled to the first bracket and the second bracket, such that the first shelf member can be removed from the first net via removal of the first bracket and the second bracket from the respective first slot and second slot.

FIG. 5C is a schematic illustration of a perspective view of the flexible container pod 500 of FIG. 5A without containers in accordance with one or more embodiments of the disclosure. Other embodiments may include additional or fewer components. The illustration of FIG. 5C may not be to scale, and may not be illustrated to scale with respect to other figures.

In FIG. 5C, the flexible container pod 500 is depicted without containers and without nets. As illustrated, a frame of the flexible container pod 500 may be formed by the base 586 (including legs 584), the center plate 530, the cross braces 580, 582, and the outriggers or members 510. The center plate 530 may include a number of apertures 532, such as an array of apertures as depicted, that may reduce a weight of the center plate 530 while maintaining structural integrity.

The base 586 may include one or more tubular members that form a rectangle, triangle, or other geometry, as well as one or more optional cross members, and one or more legs 584.

In some embodiments, instead of using nets, the flexible container pod 500 may include aluminum slats. For example, the flexible container pod 500 may be a container carrying assembly for use with an autonomous robotic system. The flexible container pod 500 may include a first aluminum slat extending from the first member to the base, a second aluminum slat extending from the second member to the base, a first shelf member coupled to the first aluminum slat, and a second shelf member coupled to the second aluminum slat. The first aluminum slat and/or the second aluminum slat may include one or more apertures for weight reduction.

Figure 5D:
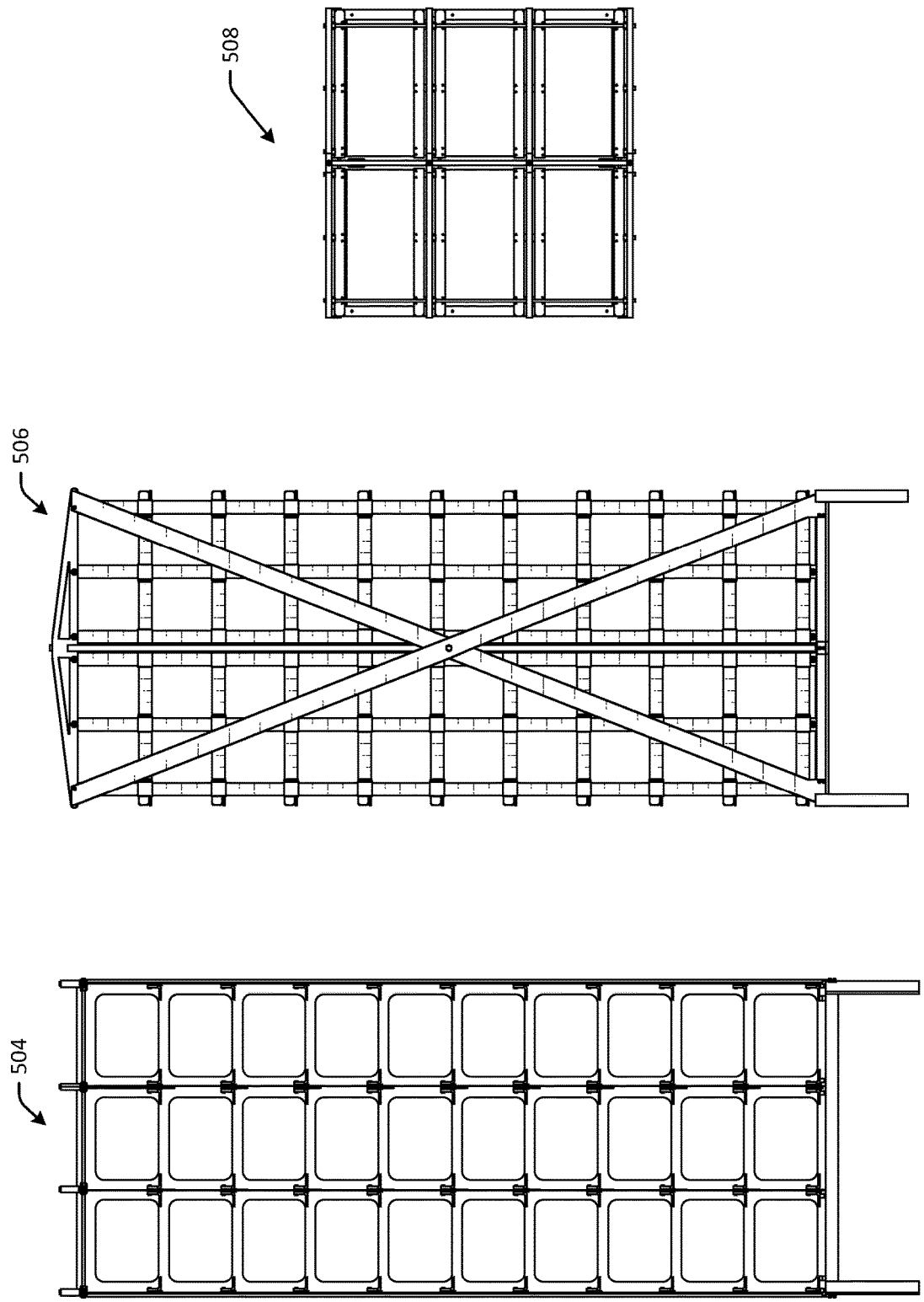
FIG. 5D is a schematic illustration of a front view, a side view, and a top view of the flexible container pod of FIG. 5A in accordance with one or more embodiments of the disclosure.

FIG. 5D is a schematic illustration of a front view, a side view, and a top view of the flexible container pod 500 of FIG. 5A in accordance with one or more embodiments of the disclosure. Other embodiments may include additional or fewer components. The illustration of FIG. 5D may not be to scale, and may not be illustrated to scale with respect to other figures.

As depicted in a front view 504, side view 508, and top view 508, the flexible container pod 500 may have any suitable height, such as a height of about 135 inches. Any number of container slots may be included in a column, such as ten in the depicted embodiment. Any number of container slots may be included in a row, such as three in the depicted embodiment. The flexible container pod 500 may have a depth of about 50 inches and a width of about 50 inches. Other dimensions may be used. The flexible container pod 500 may have a capacity of sixty containers.

Figure 6:
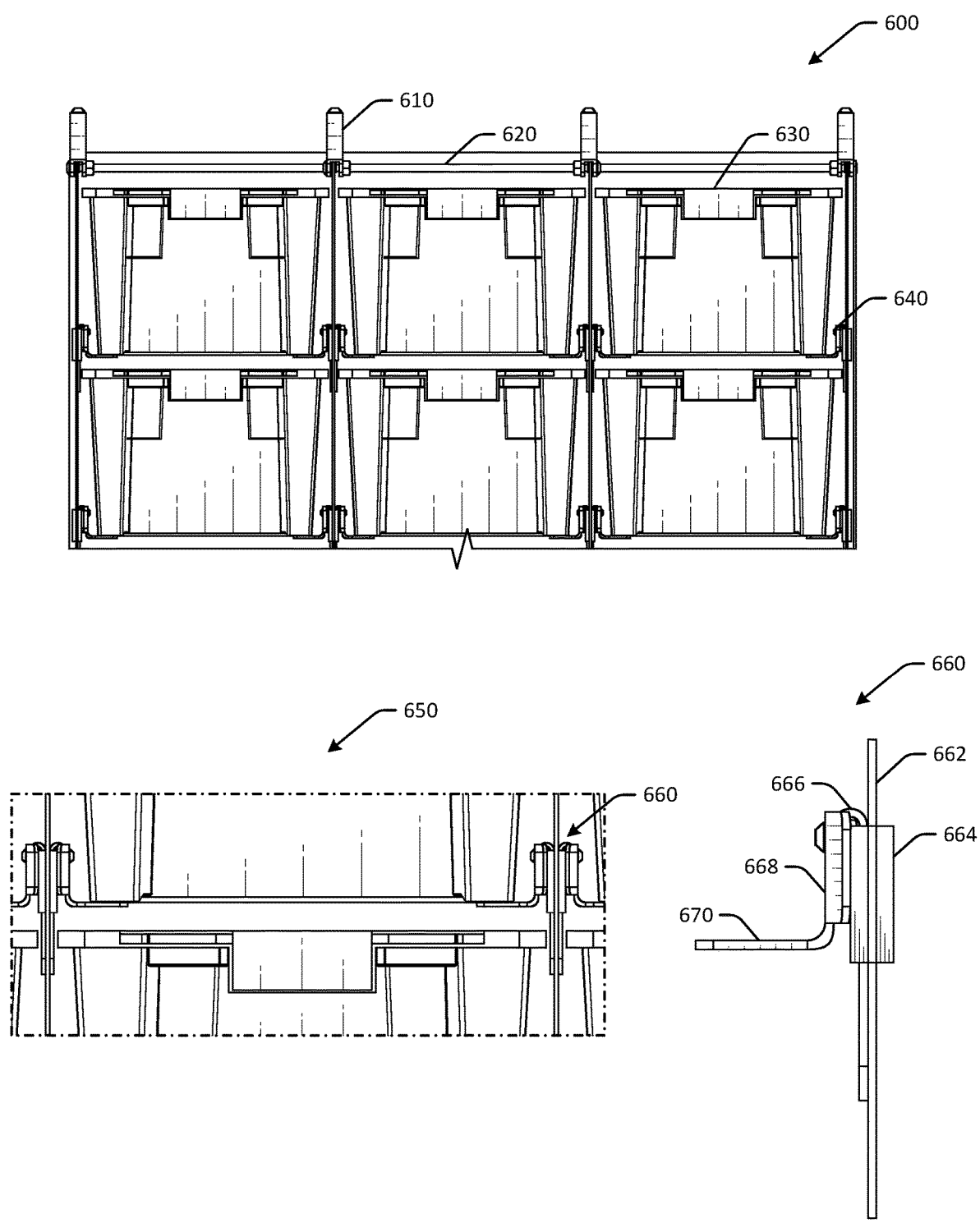
FIG. 6 is a schematic illustration of a front view of a portion of a flexible container pod and a detail view of a bracket and shelf member in accordance with one or more embodiments of the disclosure.

FIG. 6 is a schematic illustration of a front view of a portion of a flexible container pod 600 and a detail view of a bracket and shelf member in accordance with one or more embodiments of the disclosure. Other embodiments may include additional or fewer components. The illustration of FIG. 6 may not be to scale, and may not be illustrated to scale with respect to other figures. The flexible container pod illustrated in FIG. 6 may be the same flexible container pod discussed with respect to FIGS. 1-5D.

In FIG. 6, a portion of a flexible container pod 600 is depicted in front view. The flexible container pod 600 may include overhead members 610 and cross rods 620 as part of a frame of the flexible container pod 600. The cross rods 620 may pass through apertures or eyelets disposed along an end of the net(s) that form vertical sidewalls of the flexible container pod 600. The cross rods 620 may also provide fixed spacing between overhead members 610. One or more containers 630 may be disposed in container slots of the flexible container pod 600. The containers 630 may rest on shelf members 640 that are removably coupled to vertical nets of the flexible container pod 600.

In a first detail view 650 of a lower portion of the container 630, the shelf members 640 may be coupled to a bracket that can slide into and out of a slot on the net of the flexible container pod 600. For example, as depicted in a second detail view 660, the shelf member 640 may be coupled to a bracket 666 that includes a hooked portion that slides into a slot 664 on a net 662 that is vertically oriented. The slot 664 may be formed by stitching fabric or other net material to a vertical strip of net. The slot 664 may be open-ended or bottomless to allow the bracket 666 to slide in an out of the slot 664. Any number of slots may be included on various strips of the net 662. The bracket 666 may have a hook portion that has a first length, and a body portion that has a second length. The second length may be at least three times greater than the first length. For example, as depicted in FIG. 6, the body portion of the bracket 666 may be substantially longer than the hook portion to which the shelf member 640 is coupled. The increased length may provide added rigidity and stability for the shelf member 640. The shelf member 640 may include a first portion 668 and a second portion 670 that is substantially perpendicular to the first portion 668. The container 640 may rest on the second portion 670 of the shelf member 640.

Figure 7A:
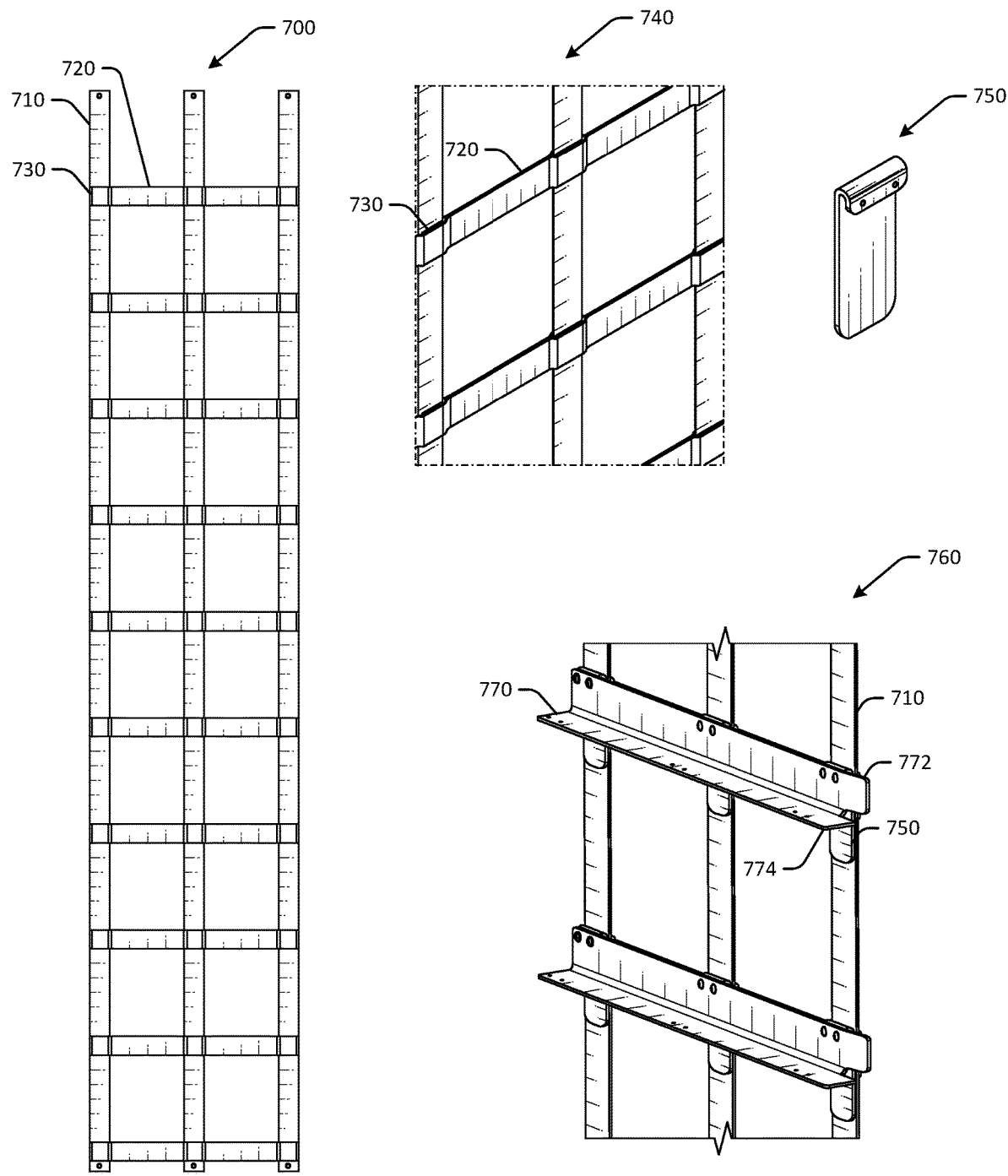
FIG. 7A is a schematic illustration of an example net, bracket, and shelf member in accordance with one or more embodiments of the disclosure.

FIG. 7A is a schematic illustration of an example net, bracket, and shelf member in accordance with one or more embodiments of the disclosure. Other embodiments may include additional or fewer components. The illustration of FIG. 7A may not be to scale, and may not be illustrated to scale with respect to other figures. The components illustrated in FIG. 7A may be the same components discussed with respect to FIGS. 1-6.

A net 700 is depicted in FIG. 7A. The net 700 may form a sidewall and/or define columns of a flexible container pod. The net 700 may include one or more vertical strips 710, one or more horizontal strips 720, and one or more slots 730. The slots 730 may be formed at one or more, or all, of the intersections between the vertical strips 710 and the horizontal strips 720. As illustrated in detail view 740, the slots 730 may provide an opening for a bracket to slide into. The slots 730 may be formed on either, or both, sides of the vertical strips 710, such that two brackets may be inserted back-to-back in slots on opposite sides of the vertical strips 710. The net 700 may be formed of polyester, plastic, KEVLAR®, an aluminum material, a synthetic material, a composite material, or a different type of material that can optionally be tensioned. In some embodiments, additional components, such as hollow rods, may be included to provide additional vertical support. In yet other embodiments, the net 700 may be a sheet instead of a net. For example, a solid sheet of polyester, plastic, or other material may be used to form the vertical sidewalls.

A bracket 750 may be inserted into the slot 730. As depicted, the bracket 750 may include a hook portion and a body portion, where the body portion has a length that is greater than the length of the hook portion, such as two times greater, three times greater, four times greater, five times greater, and/or another multiple of the hook portion length.

The flexible container pod may use the net 700 for support of a container, utilizing an angle support bracket, which in turn is supported by the slot 730 fabricated in the webbing or net 700. In some embodiments, the net 700 may have one or more threads of KEVLAR® running through the vertical strips 710, which may allow for tensioning of the net 700.

In perspective view 760, a shelf member 770 may be coupled to the bracket 750, and the bracket 750 may be inserted into a slot 730 of the net 700. The shelf member 770 may therefore be removably coupled to the net 700. For example, the net 700 may include a first slot and a second slot. A first bracket may be inserted in the first slot, and a second bracket may be inserted in the second slot. The shelf member 770 may be coupled to the first bracket and the second bracket, such that the shelf member 770 can be removed from the net 700 via removal of the first bracket and the second bracket from the respective first slot and second slot.

The shelf member 770 may include a flared end and an unflared end. For example, the flared end may include a first portion 772 that is vertically oriented and flared outward in a lateral direction, and a second portion 774 that is horizontally oriented and flared downward in a vertical direction. The flared end may increase tolerance for loading of a container and may guide the container onto the shelf member 770. Other embodiments may include flared ends at both ends to provide reversibility of shelf members. Shelf members may be easily removed and replaced.

Figure 7B:
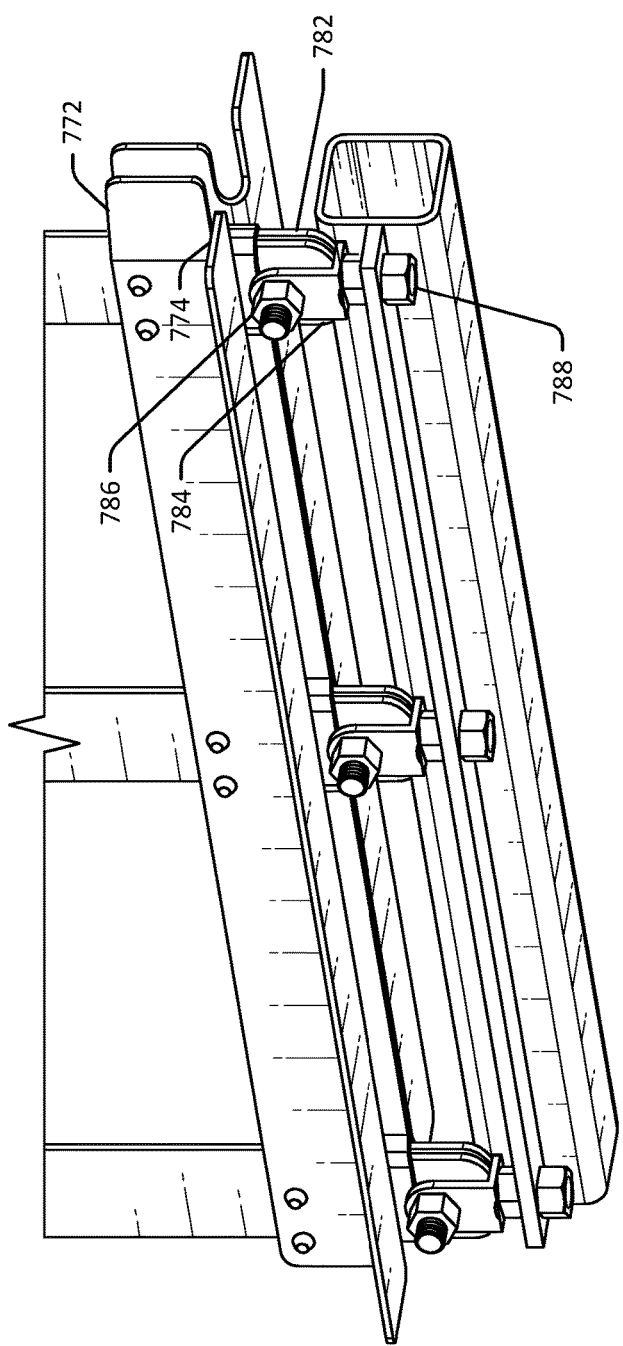
FIG. 7B is a schematic illustration of an example tensioning device in accordance with one or more embodiments of the disclosure.

FIG. 7B is a schematic illustration of an example tensioning device 780 in accordance with one or more embodiments of the disclosure. Other embodiments may include additional or fewer components. The illustration of FIG. 7B may not be to scale, and may not be illustrated to scale with respect to other figures. The tensioning device illustrated in FIG. 7B may be used with any of the systems discussed with respect to FIGS. 1-7A.

The tensioning device 780 may be used to tension the net 700 of the flexible container pod. Each net or each pair of nets may be coupled to a tensioning device. The tensioning device 780 may be configured to impart tension to the vertical strips 710 of the net 700. In some embodiments, a first tensioning device may be coupled to a first net and a base of the flexible container pod, the first tensioning device configured to tension the first net, and a second tensioning device may be coupled to a second net and the base of the flexible container pod, the second tensioning device configured to tension the second net. The tensioning device 780 may include a bracket 784 through which a first bolt 786 may be laterally positioned to secure an end 782 of a vertical strip of the net. The tensioning device 780 may be tensioned by manipulation of a second bolt 788, which may be a load eye bolt, that may cause the vertical strip of the net to be pulled and/or tensioned. The greater the tension, the less the vertical strip may flex or stretch in a lateral direction. Although the tensioning device 780 is depicted as a load eye bolt assembly in FIG. 7B, other embodiments may include different types of tensioning devices, such as clamps, spring-based devices, ratchets, and/or other tensioners.

One or more operations of the methods, process flows, or use cases of FIGS. 1-7B may have been described above as being performed by a user device, or more specifically, by one or more program module(s), applications, or the like executing on a device. It should be appreciated, however, that any of the operations of the methods, process flows, or use cases of FIGS. 1-7B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7B may be described in the context of the illustrative devices, it should be appreciated that such operations may be implemented in connection with numerous other device configurations.

The operations described and depicted in the illustrative methods, process flows, and use cases of FIGS. 1-7B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
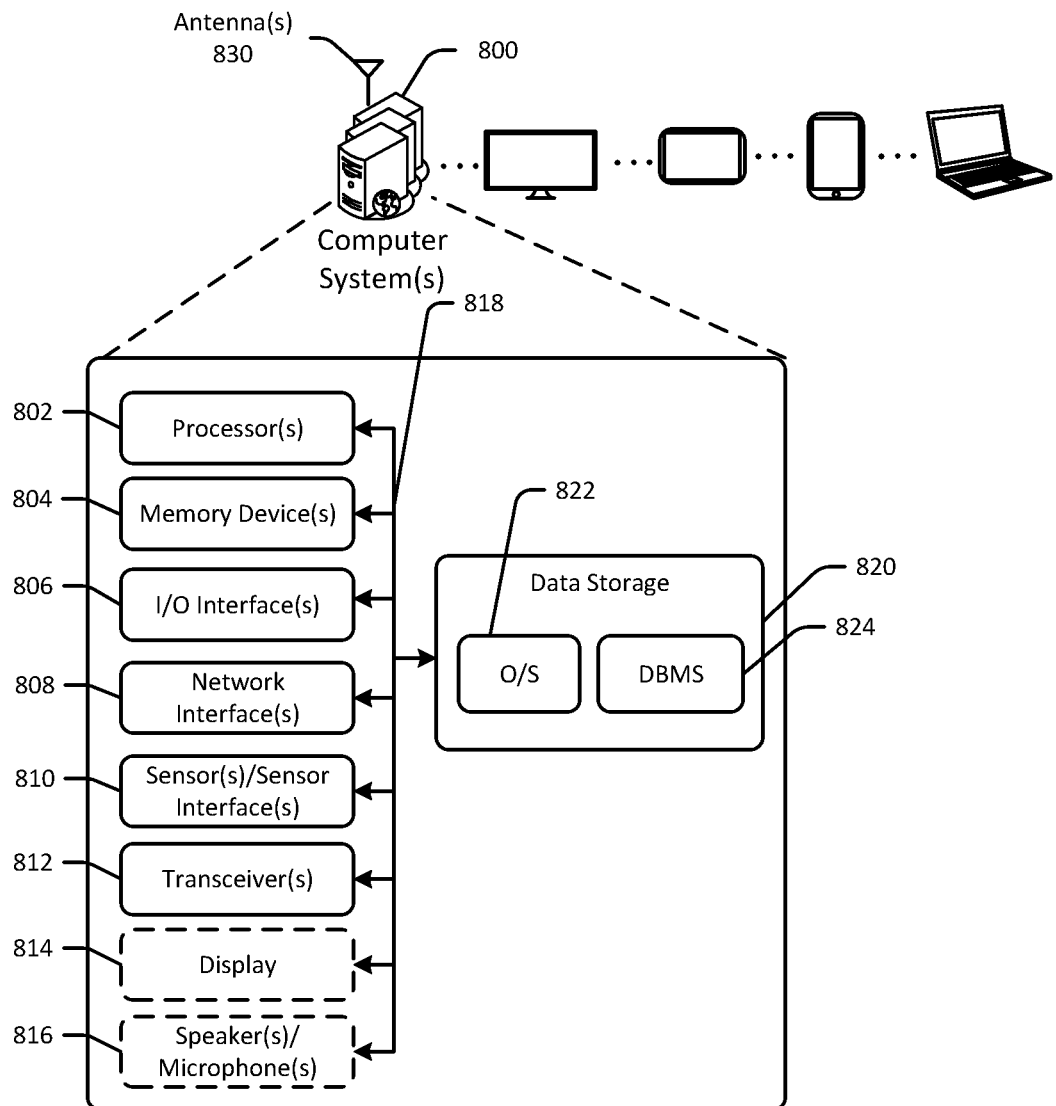
FIG. 8 schematically illustrates an example architecture of a computer system associated with a robotic system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the robotic system(s) of FIGS. 1-7B, such as robotic manipulators and/or autonomous robotic vehicles.

The computer system(s) 800 may be configured to communicate with one or more servers, user devices, or the like. The computer system(s) 800 may be configured to cause the robotic system(s) to deposit containers into one or more pods, retrieve containers, transport pods, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals.

The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7B may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. A container transportation system comprising:
   a container carrying assembly comprising:
      a center plate comprising an array of apertures;
      a first overhead member coupled to an upper end of the center plate;
      a second overhead member coupled to the upper end of the center plate;
      a base coupled to the center plate, the base comprising a set of tubular members and a set of aluminum legs;
      a first fabric net extending from the first overhead member to the base;
      a second fabric net extending from the second overhead member to the base and spaced apart from the first fabric net;

a first shelf member coupled to the first fabric net, wherein the first shelf member comprises a flared end and an unflared end, and wherein the first shelf member is a horizontal shelf member that flares downward in a vertical direction; and a second shelf member coupled to the second fabric net and spaced apart from the first shelf member, wherein a container can be removably positioned between the first fabric net and the second fabric net and on top of the first shelf member and the second shelf member, wherein the second shelf member comprises a flared end and an unflared end, and wherein the second shelf member is a horizontal shelf member that flares downward in a vertical direction;

a robotic manipulator configured to insert and remove the container from the container carrying assembly; and an autonomous robot configured to transport the container carrying assembly from a first location to a second location.

2. The container transportation system of claim 1, wherein the first fabric net comprises a first slot and a second slot, the container carrying assembly further comprising:
a first bracket inserted in the first slot; and
a second bracket inserted in the second slot;
wherein the first shelf member is coupled to the first bracket and the second bracket, such that the first shelf member can be removed from the first fabric net via removal of the first bracket and the second bracket from the respective first slot and second slot.

3. The container transportation system of claim 1, wherein the container carrying assembly further comprises:
a first aluminum cross brace member coupled to the first overhead member and a first tubular member of the base; and
a second aluminum cross brace member coupled to the first overhead member and the first tubular member of the base, the second aluminum cross brace member disposed transverse to the first aluminum cross brace member.

4. The container transportation system of claim 1, wherein the container carrying assembly further comprises:
a first tensioning device comprising a first load eye bolt, the first tensioning device coupled to the first fabric net and the base, the first tensioning device configured to tension the first fabric net; and
a second tensioning device comprising a second load eye bolt, the second tensioning device coupled to the second fabric net and the base, the second tensioning device configured to tension the second fabric net.

5. A container carrying assembly comprising:
a center plate comprising a plurality of apertures;
a first member coupled to an upper end of the center plate;
a second member coupled to the upper end of the center plate;
a base coupled to the center plate;
a first net extending from the first member to the base;
a second net extending from the second member to the base and spaced apart from the first net;
a first shelf member coupled to the first net, wherein the first shelf member comprises a flared end and an unflared end, and wherein the first shelf member is a horizontal shelf member that flares downward in a vertical direction; and
a second shelf member coupled to the second net and spaced apart from the first shelf member, wherein the second shelf member comprises a flared end and an unflared end, and wherein the second shelf member is a horizontal shelf member that flares downward in a vertical direction;
wherein a container can be removably positioned between the first net and the second net and on top of the first shelf member and the second shelf member.

6. The container carrying assembly of claim 5, wherein the first net comprises at least one of: a polyester material, an aluminum material, or a synthetic material.

7. The container carrying assembly of claim 5, further comprising:
a first tensioning device coupled to the first net and the base, the first tensioning device configured to tension the first net; and
a second tensioning device coupled to the second net and the base, the second tensioning device configured to tension the second net.

8. The container carrying assembly of claim 5, further comprising:
a first aluminum cross brace member coupled to the first member and the base; and
a second aluminum cross brace member coupled to the first member and the base, the second aluminum cross brace member disposed transverse to the first aluminum cross brace member.

9. The container carrying assembly of claim 5, wherein the base comprises:
a plurality of tubular members that form a rectangle;
a plurality of cross members; and
a plurality of legs.

10. The container carrying assembly of claim 5, wherein the container carrying assembly is configured to receive totes from a robotic manipulator, and wherein the container carrying assembly is configured to be transported by an autonomous robot.

11. The container carrying assembly of claim 5, wherein the center plate extends parallel to a front side and a back side of the container carrying assembly, and wherein the first net, the second net, the first shelf member, and the second shelf member each extend transverse to the center plate.

12. The container carrying assembly of claim 5, wherein the first net comprises a first slot and a second slot, the container carrying assembly further comprising:
a first bracket inserted in the first slot; and
a second bracket inserted in the second slot;
wherein the first shelf member is coupled to the first bracket and the second bracket, such that the first shelf member can be removed from the first net via removal of the first bracket and the second bracket from the respective first slot and second slot.

13. The container carrying assembly of claim 12, wherein the first bracket comprises a hook portion having a first length and a body portion having a second length that is at least three times greater than the first length.

14. The container carrying assembly of claim 5, wherein the first member comprises a first taper between a center of the first member and a first end of the first member, and a second taper between the center of the first member and a second end of the first member.

15. The container carrying assembly of claim 14, wherein the first member further comprises an aperture extending through a body of the first member.

16. A container carrying assembly comprising:
a center plate comprising a plurality of apertures;
a first member coupled to an upper end of the center plate;
a second member coupled to the upper end of the center plate;

a base coupled to the center plate;
a first aluminum slat extending from the first member to the base;
a second aluminum slat extending from the second member to the base and spaced apart from the first aluminum slat;
a first shelf member coupled to the first aluminum slat, wherein the first shelf member comprises a flared end and an unflared end, and wherein the first shelf member is a horizontal shelf member that flares downward in a vertical direction; and
a second shelf member coupled to the second aluminum slat and spaced apart from the first shelf member, wherein the second shelf member comprises a flared end and an unflared end, and wherein the second shelf member is a horizontal shelf member that flares downward in a vertical direction;
wherein a container can be removably positioned between the first aluminum slat and the second aluminum slat and on top of the first shelf member and the second shelf member.

17. The container carrying assembly of claim 16, wherein the first aluminum slat comprises a plurality of apertures.

18. The container carrying assembly of claim 16, wherein the center plate extends parallel to a front side and a back side of the container carrying assembly, and wherein the first aluminum slat, the second aluminum slat, the first shelf member, and the second shelf member each extend transverse to the center plate.

19. The container carrying assembly of claim 16, wherein the first aluminum slat comprises a first slot and a second slot, the container carrying assembly further comprising:
a first bracket inserted in the first slot; and
a second bracket inserted in the second slot;
wherein the first shelf member is coupled to the first bracket and the second bracket, such that the first shelf member can be removed from the first aluminum slat via removal of the first bracket and the second bracket from the respective first slot and second slot.

20. The container carrying assembly of claim 19, wherein the first bracket comprises a hook portion having a first length and a body portion having a second length that is at least three times greater than the first length.

* * * * *